United States Patent [19]

Elmer

[11] 4,026,744
[45] May 31, 1977

[54] GLASS CORD ADHESIVES COMPRISING VINYL PYRIDINE TERPOLYMER/LIGNIN SULFONATE-RESORCINOL-FORMALDEHYDE REACTION PRODUCT; METHOD OF USE AND COMPOSITE ARTICLE

[75] Inventor: Otto C. Elmer, Akron, Ohio

[73] Assignee: The General Tire & Rubber Company, Akron, Ohio

[22] Filed: Oct. 18, 1976

[21] Appl. No.: 733,610

Related U.S. Application Data

[62] Division of Ser. No. 542,974, Jan. 22, 1975.

[52] U.S. Cl. .................. 156/110 A; 156/308; 156/335; 260/3; 260/17.5; 260/29.3; 260/42.18; 260/845; 260/846; 428/295; 428/392

[51] Int. Cl.² ............ B29H 5/02; C08L 9/08; C08L 61/12; C08L 97/00

[58] Field of Search ............ 260/17.5, 29.3, 42.18, 260/845, 846, 3; 428/392, 295; 156/308, 335, 110 A

[56] References Cited

UNITED STATES PATENTS

| | | | |
|---|---|---|---|
| 3,167,523 | 1/1965 | Dimitri | 260/17.5 |
| 3,227,667 | 1/1966 | Moffit et al. | 260/17.5 |
| 3,300,426 | 1/1967 | Hunsucker | 260/29.3 |
| 3,663,491 | 5/1972 | Kibler | 260/845 |
| 3,853,605 | 12/1974 | Fahey | 260/845 |
| 3,902,950 | 9/1975 | Tung et al. | 156/308 |

FOREIGN PATENTS OR APPLICATIONS 1,146,304   3/1969   United Kingdom

OTHER PUBLICATIONS

Chem. Abs. 68:P88037e; 64:P6866f; 66:P66340e; 71:P71761a; 73:P36119s; P:68311q; and P:78358z; 75:P152920m; 75:P152774s; Subject Index 1967–1971 p. 175298 (8th Coll. Index).

Primary Examiner—Murray Tillman
Assistant Examiner—T. De Benedictis, Sr.

[57] ABSTRACT

Rubber compounds are readily bonded to reinforcing elements, particularly tire cords of glass fibers, using a one-step dip process in which the dip contains an alkaline aqueous dispersion of a mixture of a major amount by weight of a rubbery vinyl pyridine/styrene/butadiene terpolymer and a lignin sulfonate-resorcinol-formaldehyde reaction product. Good adhesion of the cords to a rubber compound are obtained with this process.

8 Claims, No Drawings

GLASS CORD ADHESIVES COMPRISING VINYL PYRIDINE TERPOLYMER/LIGNIN SULFONATE-RESORCINOL-FORMALDEHYDE REACTION PRODUCT; METHOD OF USE AND COMPOSITE ARTICLE

This is a division, of application Ser. No. 542,974 filed Jan. 22, 1975.

BACKGROUND OF THE INVENTION

The present invention relates to compositions and methods of bonding cord tire reinforcement to the conjugated diene based rubber of tire carcasses and the improved structures obtained thereby.

In the manufacture of cord reinforced tires, the cord is sometimes coated by the cord manufacturer with a material which improves adhesion of the cord to the rubber body of the tire. Cord free of adhesion promoter will be referred to as greige or uncoated. After the cord is received from the manufacturer in the form of a fabric, the general practice is to prepare the cord by applying a dip coating of a latex. The dip coating of the cord generally used contains a vinyl pyridine/styrene/butadiene terpolymer and a resorcinolformaldehyde (RF) resin. While these RF resins are quite effective in performing their desired function, the resorcinol component is expensive and often unobtainable in the quantities needed.

Materials in addition to RF resins have been used in the prior art to improve adhesion in special circumstances. For instance, a number of proprietary formulations of unknown composition are marketed for this purpose.

SUMMARY OF THE INVENTION

According to the present invention it has been discovered that reinforcing cords, particularly glass, but also other cords such as polyester and aramid (also known as Kevlar)*, can be directly bonded or adhered to cured rubber by first dipping the cords in a dip containing an aqueous alkaline dispersion of a mixture of a rubbery vinyl pyridine terpolymer, a resorcinol-formaldehyde-lignin sulfonate reaction product, drying the same, and combining said dipped and dried element with a vulcanizable conjugated diene rubber compound such as a butadiene-styrene rubber compound and vulcanizing the same.

*Available from Du Pont

Reinforcing cords treated in this fashion exhibit high rubber to cord adhesion values. Also, aged reinforcing cords retain a major amount of their original rubber to cord adhesion values.

DISCUSSION OF DETAILS AND PREFERRED EMBODIMENTS

In the present application the term "cords" is intended to include reinforcing elements used in rubber products including fibers, continuous filaments, staple, tow, yarns, fabric and the like, particularly cords for use in building the carcasses of tires such as truck tires.

The reinforcing element or cord comprises a plurality of substantially continuous fibers or monofilaments.

In the case of glass, the reinforcing element or fibers contain little or no twist. In other words, twist is not intentionally applied to the element or fibers; the only twist, if any, in the element or fibers is that occasioned on passing through the glass fiber processing apparatus and on packaging or winding up the cord to form a bobbin or spool. However, in a continuous process, the elements can proceed directly from the glass processing apparatus, can be dipped in the aqueous adhesive cord dip, dried, and given a twist of about 1.5 turns per inch thereafter. The elements then are woven into tire fabric having about one quite small pick thread or element, nylon or polyester, which may be a monofilament, per inch and calendered with a rubber ply or skim stock. The glass fiber reinforced ply stock is then ready to be used in the manufacture of a tire or for other purposes.

Glass compositions, polyesters, polyamides and a number of other materials, useful in making the fibers for the reinforcing element or glass tire cord are well known to the art. One of the preferred glasses to use is a glass known as E glass and described in "Mechanics of Pneumatic Tires," Clark, National Bureau of Standards Monograph 122, U.S. Dept. of Commerce, issued November 1971, pages 241-243, 290 and 291. The number of filaments or fibers employed in the fiber reinforcing element or cord can vary considerably depending on the ultimate use or service requirements. Likewise, the number of strands of fibers used to make a fiber reinforcing element or cord can vary widely. In general, the number of filaments in the fiber reinforcing element or cord for a passenger car tire can vary from about 500 to 3,000 and the number of strands in the reinforcing element can vary from 1 to 10, preferably the number of strands is from 1 to 7 and the total number of filaments about 2,000. A representative industry glass tire cord known as G-75 (or G-75, 5/0) has 5 strands each with 408 glass filaments. Another representative cord known as G-15 has a single strand containing 2,040 glass filaments. In this connection reference is made to Wolf, "Rubber Journal," February, 1971, pages 26 and 27 and U.S. Pat. No. 3,433,689.

Shortly after the glass fibers are formed they are usually sized (by spraying or dipping and so forth and air drying) with a very small amount or fractional amount by weight of a material which acts as a protective coating during processing and handling of the glass fibers in forming the strands or reinforcing elements and during packaging. During the subsequent dipping in the aqueous adhesive tire cord dip, it is believed that the size is not removed. Materials for use as sizes for glass fibers are well known to the art. It is preferred to use a silane as a size, especially a silane which has groups which can bond or coordinate chemically or physically with at least parts of the surface of the glass of the glass fiber and with at least one or more of the components of the glass fiber aqueous adhesive cord dip. A very useful size to employ on the glass fibers is gamma-aminopropyl triethoxy silane, or similar aminoalkyl alkoxy silanes, which, when applied to the glass fibers, hydrolyzes and polymerizes to form a poly(aminosiloxane) in which a portion of the polymer is attached to the glass and another portion contains amine groups (having active hydrogen atoms) for reaction with components of the cord dip such as the RF resin or the vinyl pyridine copolymer compound. Various glass fiber sizing compounds and compositions are shown in U.S. Pat. Nos. 3,252,278; 3,287,204 and 3,538,974.

The type of rubber latex used in the tire cord dip bath of this invention is a latex of a terpolymer of a vinyl pyridine and a conjugated diolefin having 4 to 6 carbon atoms. The rubber latex is of the type described in U.S. Pat. No. 2,561,215 and comprises an aqueous dispersion of a terpolymer of 50 to 95% by weight of a conjugated diolefin having 4 to 6 carbon atoms, 5 to 40% of a vinyl pyridine and 0 to 40% of a styrene. Examples of suitable vinyl pyridines are 2-vinyl pyridine, 4-vinyl pyridine, 2-methyl-5-vinyl pyridine, and 5-ethyl-2-vinyl pyridine.

In practicing this invention, it is usually preferred to use a latex of a terpolymer of from about 60 to 80% by weight of 1,3-butadiene, 10 to 30% by weight of styrene and 10 to 30% by weight of 2-vinyl pyridine, the percentage based on the weight of the three recited components. The Mooney viscosity range of the dry solids is 40 to 120, preferably 40 to 60 ML-4. Other components may be present but are not used in the calculation. Excellent results are obtained using a latex of a terpolymer of about 70% of 1,3-butadiene, 15% of styrene and 15% of a 2-vinyl pyridine, by weight, having a total solids content of around 30 to 50%. The terpolymer has a 4 minute Mooney viscosity ML-4 of 50 at 212° F. Further disclosures of rubbery vinyl pyridine terpolymer latices may be found in U.S. Pat. Nos. 2,615,826 and 3,437,122. The terpolymer can be replaced in a minor part with other elastomeric materials such as styrene-butadiene, carboxylated styrene-butadiene and other latex forming materials well known in the cord dip art.

The lignin sulfonates usable in the dip of the present invention are selected from materials that are known in the art. They are made, for example, by the reaction of sulfurous acid on lignin. This reaction results in the introduction of sulfonic acid groups in the $\alpha$ or $\gamma$ position of the phenyl propane unit:

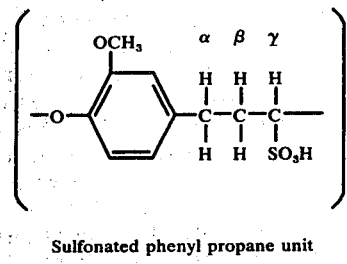

Sulfonated phenyl propane unit

This is followed by reaction with a base.

The lignin sulfonates used in the practice of the present invention are the water soluble salts. Depending upon pH there may also be some lignin sulfonic acid groups present. The pH range is from 7 to 12.

The lignin sulfonate reaction product of the present invention is prepared by dissolving of weighted amounts of resorcinol in water by agitation; addition of measured amount of NaOH solution; slow addition of lignin sulfonate powder to the agitated solution to achieve uniform wetting of the dry powder; agitation until powder dissolves and addition with stirring of measured amount of formaldehyde solution with agitation for 5 minutes.

The reaction product (including unreacted components, if present) contains from 22 to 42% preferably from 27 to 37% lignin sulfonate, from 27 to 47% preferably 32 to 42% resorcinol and from 21 to 41% preferably 26 to 36% formaldehyde. All percentages are based on dry solids of the above recited components.

The final dip is prepared by slow addition of the reaction product to the terpolymer latex. After addition the mixture is aged preferably at least 16 hours before use as a cord dip. The pH of the final dip ranges from about 8 to 11 preferably about 9 to 10.

Lignin sulfonates plus water soluble carbohydrates form the solids of Orzan A, trade name of Crown-Zellerbach lignin sulfonate. The other Orzan products are manufactured from Orzan A.

The following properties of a few commercial lignin sulfonates are tabulated. All products are tan, free flowing, water soluble powders.

|  | Orzan A | Orzan S | Orzan P |
|---|---|---|---|
| pH of 25% solution | 4 | 7 | 5 |
| Water content, % | 6 | 5 | 5 |
| Bulk density, lb/cu ft | 31 | 31 | 20 |
| Components |  |  |  |
| Lignin sulfonic acids | 57.0 | 48 | 51 |
| Reducing sugars* (as glucose) | 15.0 | 12 | 12 |
| Ash | 1.5 | 20 | 5 |
| Primary cation | NH$_4$+ | Na+ | NH$_4$+ |
| Elemental Analysis |  |  |  |
| C | 45.6 | 41.6 |  |
| H | 5.6 | 5.0 |  |
| S | 6.4 | 7.0 |  |
| N | 3.7 | 0.5 |  |
| Na | 0.05 | 5.9 |  |

*The following sugars made up the total sugar content: Mannose 48%, Glucose 15%, Xylose 15%, Galactose 10%, Fructose 72%

The heat reactable resorcinol-formaldehyde-lignin sulfonate reaction product is preferably made by reacting formaldehyde (or formaldehyde donor) with resorcinol or similar phenolic compound and lignin sulfonate in aqueous media using sodium hydroxide and the like as a catalyst to form water soluble resins containing hydroxyl and methylol groups.

The ratio of the vinyl pyridine terpolymer (on a dry basis) to the reaction product of formaldehyde, resorcinol and lignin sulfonate is from about 100:5 to 100:30 parts by weight, preferably from about 100:8 to 100:20 parts by weight.

Water is used in the dip in an amount sufficient to provide for the desired dispersion of the vinyl pyridine latex particles and the solution or dispersion of the lignin sulfonate reaction product and for the proper solids content to get the necessary pick-up of solids on and penetration between the fibers of the polyester cord.

The dip thus consists essentially of an aqueous dispersion of the rubbery vinyl pyridine terpolymer latex, the lignin sulfonate reaction product; the reaction product being present in a total amount (as dry solids, dispersed or dissolved in the water per hundred parts of latex solids) of from about 1 to 30 parts by weight, preferably 8 to 20 parts. The range of reacted and unreacted lignin sulfonate in the dip is from about 0.3 to 10 parts, preferably 3 to 7 parts, from 0.3 to 10 parts, preferably 3 to 7 parts, of reacted and unreacted formaldehyde are present, from 0.3 to 10 parts preferably 3 to 7 parts, of reacted and unreacted resorcinol are present, and the terpolymer is present at a level of 100 parts on a dry weight basis (assuming complete reaction). Sufficient alkaline material is usually present from the lignin sulfonate reaction product solution to render the dip alkaline or additional alkaline material such as NaOH can be added to achieve this purpose. The function of the alkaline material is to prevent premature coagulation of the rubbery vinyl pyridine terpolymer and also to catalyze the resorcinol-formaldehyde-lignin sulfonate reaction.

The concentration of lignin sulfonate reaction product in the aqueous dispersion is about 0.5 to about 10% and preferably about 2 to about 7%. The concentration of vinyl pyridine terpolymer on a wet basis is from about 7 to 40% and preferably about 20 to 35%. The concentration of solids in the aqueous dispersion (or dip) on a wet basis is 15 to 45, preferably 20 to 40. A high solids results in coagulation of the latex and a low solids results in a low D.P.U. and poor performance of the cord.

In order to apply the adhesive dip to the cords in a reliable manner, the cords are fed through an adhesive dip bath containing the rubbery vinyl pyridine terpolymer and the lignin sulfonate reaction product, into a drying oven where they are dried. Also, as the cords leave the oven they enter a cooling zone where they are air cooled. In each case the adhesive-coated cords leaving the dip are dried in the oven at from about 300° to 500° F. for from about 30 to 150 seconds. The time the cord remains in the dip is about a second or so or at least for a period of time sufficient to allow wetting of the cord by the adhesive mixture.

The adhesive containing reinforcing elements of this invention is preferably adhered to a vulcanized blend of natural rubber, polybutadiene rubber, and rubbery butadiene-styrene copolymer by curing the same in combination together. The adhesive containing glass reinforcing element can also be adhered to other vulcanized conjugated diene rubber, by curing or vulcanizing the same in combination with the rubber. Examples of other conjugated diene rubbers include: nitrile rubbers, chloroprene rubbers, polyisoprenes, vinyl pyridine rubbers, acrylic rubbers, isoprene-acrylonitrile rubbers and the like and mixtures of the same. These rubbers prior to curing can be mixed with the usual compounding ingredients including sulfur, stearic acid, zinc oxide, magnesium oxide, accerators, antioxidants, antiozonants and other curatives and the like well known to those skilled in the art for the particular rubbers being employed. Rubbers when proportions are referred to, as referred to here and in the claims, refers to the elastomer component and excludes the above compounding ingredients, e.g., a reference to a major component of the rubber being a conjugated diene polymer would refer to a major component of the elastomeric content of the composition. The rubbers referred to above are old and well known in the art and will not be described in detail here.

The major diene component of the rubber used in the practice of the present invention is a conjugated diene as opposed to a non-conjugated diene. Preferably the entire elastomeric component is conjugated diene polymer, free of ethylene/propylene/non-conjugated diene.

Fibers, yarns, filaments, cords or fabric and the like coated with the adhesive of the present invention can have from about 3 to 50% by weight (dry) total solids from the adhesive dip on the cord based on the weight of the undipped cord (D.P.U.) and can be used in the manufacture of radial, bias, or belted-bias passenger tires, truck tires, motorcycle and bicycle tires, off-the-road tires, airplane tires, transmission belts, V-belts, conveyor belts, hose, gaskets, rubbers, tarpaulins and the like. The D.P.U. varies as to substrate as is known in the art. Glass cord, for example, requires a D.P.U. of 15 to 30% and an organic cord requires 2 to 10% preferably 3 to 8%.

The following examples will serve to illustrate the invention with more particularity to those skilled in the art. In these examples the parts and percentages are parts and percentages by weight unless otherwise indicated.

The H-adhesion test referred to above measures the static adhesion of the dried adhesive coated fibers to cured rubber.

In each case the rubber test specimens are made from one of three standard type rubber compositions using the following three recipes:

| Stock A | Parts by Weight |
|---|---|
| Natural Rubber | 50 |
| Butadiene-styrene rubbery copolymer average 23.5% bound styrene, SBR-1502, emulsion polymerized | 50 |
| High abrasion furnace carbon black | 20 |
| "Endor", activated zinc salt of pentachloro - thiophenol, peptizing agent, duPont | 0.5 |
| "Circosol" 2XH, napthenic type oil Sun Oil Company | 7.0 |
| Zinc Oxide | 3.0 |
| Stearic Acid | 1.0 |
| "AgeRite Spar", a mixture of mono-, di- and tri-styrenated phenols, antioxidant, R. T. Vanderbilt Co., Inc. | 1.0 |
| "Picco 100", alkyl aromatic polyindene resin, reinforcing and processing oil, Pennsylvania Industrial Chemical Corp. | 2.0 |
| Diphenylguanidine | 0.5 |
| N-Oxydiethylene benzothiazole-2-sulfenamide | 0.9 |
| Sulfur (insoluble) | 2.6 |
| Stock B | Parts by Weight |
| Natural rubber | 46.64 |
| Butadiene-styrene rubbery copolymer, average 23.5% bound styrene, SBR-1500, emulsion polymerized | 38.5 |
| Polybutadiene, solution polymerized BD, about 93% cis-1,4, Raw Mooney ML-4 at 212° F. about 40–50 | 15.0 |
| Carbon black, fast extrusion furnace | 45.0 |
| Hydrated silica, "Hi-Sil" 233, PPG Industries, Inc. | 15.0 |
| "BLE" 25 antioxidant, a high temperature reaction product of diphenylamine and acetone, Naugatuck Chemical Division of Uniroyal | 2.0 |
| Processing oil, a blend of highly aromatic petroleum fractions | 5.0 |
| Zinc oxide | 3.0 |
| Stearic acid | 1.5 |
| "Cohedur" RL, a 1:1 mixture of resorcinol and "Cohedur" A (the pentamethyl ether of hexamethylol melamine) which is a colorless, viscous liquid which liberates formaldehyde on heating. Naftone, Inc. | 4.7 |
| N-tert-butyl-2-benzothiazole-sulfenamide, "Santocure" NS, Monsanto Chemical Co. | 1.2 |
| Sulfur | 3.0 |
| Stock C | Parts by Weight |
| Natural rubber (No. 3 Smoked Sheet) | 36.50 |
| Butadiene-styrene rubbery copolymer, average 23.5% bound styrene, emulsion polymerized | 43.50 |
| Polybutadiene (solution polymerized BD, about 93% cis-1,4, Raw Mooney ML-4 at 212° about 40–50) | 20.0 |
| Carbon black, fast extrusion furnace | 35.0 |
| Carbon black, high abrasion furnace (high structure) | 35.0 |
| Alkyl aromatic polyindene resin, reinforcing and processing aid, Picco 100, Pennsylvania Industrial Chemical Corp. | 4.5 |
| Naphthenic oil, Circosol type 2XH, Sun Oil Co. | 32.80 |
| Zinc oxide | 3.8 |
| Stearic acid | 1.5 |
| Mixture of mono, di and tristyrenated phenols, AgeRite Spar, R. T. Vanderbilt Co., Inc., antioxidant | 1.2 |
| Benzothiazyl disulfide, Altax, R. T. Vanderbilt Co., Inc., | 1.2 |

-continued

| accelerator Tetramethyl thiuram monosulfide, active ingredient, Thionex, accelerator, E. I. du Pont de Nemours & Co., Inc. | 0.1 |
|---|---|
| Crystex, about 80% insoluble sulfur and 20% petroleum oil, Stauffer Chemical Co. | 3.0 |

EXAMPLES I, II AND III

High solids glass cord dips were prepared that contained a molar ratio of resorcinol to formaldehyde of 1:1.6, 16.0g resin per 100g. latex solids and 36% total solids content. The dips were prepared by dissolving weighted amounts of resorcinol in water by agitation; addition of measured amount of NaOH solution, slow addition of Orzan powder to the agitated solution to achieve uniform wetting of the dry powder; agitation until powder dissolved; addition with stirring of measured amount of formaldehyde solution; agitation for 5 minutes and slow addition of this resin to 244g. of a stirred latex containing 25g. of a copolymer of 48% styrene and 52% butadiene and 75g. of a terpolymer of 15% styrene, 70% butadiene and 15% of 2-vinyl pyridine. The dips are aged at least 16 hours after formulation before being used to coat cords.

Table I shows results obtained in this series, all dips contained in addition to the latex 53.73g. $H_2O$, 2.00g. 1N NaOH and 13.13g. 37% aqueous formaldehyde. The G-15 glass cord was dipped at room temperature and cured for 45 seconds in a 425° F. gradient oven.

TABLE I

| DIP | I* | | II | | III | |
|---|---|---|---|---|---|---|
| Resorcinol, g. | 6.15 | | 6.15 | | 6.15 | |
| Orzan S | 5 | | 0 | | 0 | |
| Orzan A | 0 | | 5 | | 0 | |
| Orzan P | 0 | | 0 | | 5 | |
| Viscosity, cps | | | | | | |
| fresh | 17 | | 60 | | 370 | |
| 1 day old | 29.5 | | 41 | | 660 | |
| D.P.U. % | 19 | 31.5 | 20.4 | 31.2 | 19.1 | 33.8 |
| Tensile, psi | | | | | | |
| original | 65.7 | 64.8 | 69.1 | 66.8 | 65.9 | 69.3 |
| humid aged, 3 days/175° F. | 54.1 | 45.3 | 63.2 | 56.1 | 64 | 56.7 |
| H-adhesion in Stock A | | | | | | |
| Room Temp. | 31.0 | 29.8 | 22 | 14.9 | 19 | 22.7 |
| 250° F. | 21.5 | 20.6 | 9.8 | 7.2 | 13 | 13.7 |
| H-adhesion in Stock B | | | | | | |
| Room Temp. | 43.0 | 40.2 | 40 | 33.5 | 39.3 | 39.3 |
| 250° F. | 29.4 | 31.2 | 25.7 | 23.6 | 25.6 | 27.8 |

*DIP I corresponds to Example I, etc.

EXAMPLES IV – VII

Table II gives results obtained with two levels of Orzan S and two different latex combinations. All dips contain 53.73g. $H_2O$, 2.00g. of 1N NaOH and 13.12g. of 37% formaldehyde (aqueous). The dips were prepared in the same manner as Example I.

TABLE II

| DIP | IV | V | VI | VII |
|---|---|---|---|---|
| Resorcinol, g. | 11.15 | 6.15 | 6.15 | 6.15 |
| Orzan S | 5 | 10 | 5 | 10 |
| Latex A[1] | 244 | 244 | 183 | 183 |

TABLE II-continued

| DIP | IV | V | VI | VII |
|---|---|---|---|---|
| Latex B[2] | 0 | 0 | 61 | 61 |
| D.P.U. % | 21.1 | 21.2 | 22.5 | 25.0 |
| H-Adhesion in | | | | |
| Stock A, lbs. | 33.0 | 26.7 | 30.1 | 33.3 |
| Tensile, Original, lbs. | 72.2 | 71.6 | 66.7 | 63.2 |
| Humid Aged, 3 days/175° F. | 68 | 66.7 | 57.3 | 63.7 |
| D.P.U. % | 40 | 44 | 44 | 44 |
| H-Adhesion in | | | | |
| Stock A, lbs. | 29.4 | 34.6 | 29.6 | 27.0 |
| Tensile, Original, lbs. | 67.1 | 60 | 64.7 | 61.2 |
| Humid Aged, 3 days/175° F. | 51 | 60 | 42.8 | 46.1 |

[1]Latex A is a 41% solids latex of a terpolymer containing 15% styrene, 70% butadiene and 15% 2-vinyl pyridine.
[2]Latex B is a 41% solids latex of a copolymer containing 52% butadiene and 48% styrene.

EXAMPLE VIII

A formaldehyde pre-reacted lignin sulfonate was prepared by reacting a.  50g. Ammonium salt of lignin sulfonate
    100g. $H_2O$
    27g. $CH_2O$ (37%)
    for 24 hours at 80° C.

A glass dip from the methyloated lignin sulfonate was prepared by blending

| 6.0g. | Resorcinol | } Solution I |
|---|---|---|
| 30.0g. | $H_2O$ | |
| 2.0g. | 1N NaOH | | with
| 23.5g. | Reaction product of "a." above | } Solution II |
|---|---|---|
| 50.0g. | $H_2O$ | |

Then 6.64g. of 37% $CH_2O$ were added, and the resulting solution slowly added to 244g. of a latex containing 100g. of a terpolymer containing 70% butadiene, 15% styrene and 15% 2-vinyl pyridine resulting in a dip containing 32% total solids. The dip was aged 16 hours and glass cord was dipped at two D.P.U. levels. The following H-adhesion results were obtained:

| | H-adhesion, lbs. | |
|---|---|---|
| D.P.U. % | Stock A | Stock B |
| 16.5 | 30.8 | 37.0 |
| 30.4 | 33.7 | 37.4 |

EXAMPLES IX AND X

The following dips were prepared by mixing the Penacolite solution and the NaOH solution, slow addition of the lignin sulfonate to the agitated solution until the lignin sulfonate dissolves; addition with stirring of the formaldehyde solution; then slow addition of the resin formed, to 244g. of a latex containing as the solids component 100g. of a terpolymer containing 65.5% butadiene, 23.5% styrene and 11.0% 2-vinyl pyridine. Table III sets forth the results obtained using the composition set forth to coat glass cords.

TABLE III

| DIP | IX | X |
|---|---|---|
| Penacolite R2170[1] | 10.5 | 10.5 |

TABLE III-continued

| | | | | | | | | |
|---|---|---|---|---|---|---|---|---|
| Lignin sulfonate | | 6.1[2] | | | | 6.1[3] | | |
| 1N NaOH | | 4.0 | | | | 4.0 | | |
| H$_2$O | | 50.0 | | | | 50.0 | | |
| CH$_2$O (37%) | | 9.5 | | | | 9.5 | | |
| D.P.U. % | 20 | | 32.2 | | 21.3 | | 26.5 | |
| Tensile, lbs. | 71.3 | | 72.4 | | 72 | | 70.9 | |
| Aged 175° F./3 days/H$_2$O | 62.1 | | 48.4 | | 59.5 | | 54.1 | |
| Aged 300° F./24hrs/H$_2$O | 35.7 | | 36.9 | | 41.7 | | 41.1 | |
| | Stock A | Stock B | Stock A | Stock B | Stock A | Stock B | Stock A | Stock B |
| H-adhesion | 33.6 | 43.2 | 31.0 | 42.4 | 31.1 | 40.6 | 30.6 | 41.1 |
| Aged 300° F./24hrs/H$_2$O | 18.0 | 30.0 | 20.0 | 32.8 | 17.3 | 28.0 | 21.2 | 33.0 |

After dipping, the cords were cured for 45 seconds at 440° F.

[1] A 75% solids solution in water of the acid reaction product of one mole of resorcinol with one-half mole formaldehyde.
[2] Orzan S
[3] Orzan LS - Orzan S with carbohydrates removed.

EXAMPLES XI AND XII

The following dips were prepared in the same manner as in Example IX and X using 244g. of the same latex.

TABLE IV

| DIP | XI | XII |
|---|---|---|
| Penacolite R2170, g. | 10.5 | — |
| Resorcinol, g. | — | 6.15 |
| Orzan S, g. | 6.1 | 5 |
| 1N NaOH | 4.0 | 4.0 |
| CH$_2$O (37%), g. | 9.5 | 13.12 |
| H$_2$O | 50.0 | 50.0 |
| D.P.U. % | 21.3   32.5 | 20   30.6 |
| H-Adhesion, Stock A, lbs. | | |
| Room Temp. | 39.1   34.4 | 31.5   32.1 |
| 250° F. | 25.1   23.8 | 21.2   19.7 |
| Aged 300° F/24 hrs/H$_2$O | 21.6   21.4 | 19.9   19.1 |
| H-Adhesion, Stock B, lbs. | | |
| Room Temp. | 44.1   39.0 | 44.6   44.9 |
| 250° F. | 27.4   29.8 | 30.4   29.9 |
| Aged 300° F/24hrs/H$_2$O | 32.1   33.4 | 33.9   30.2 |
| Tensile, Original, lbs. | 74.5   73.9 | 70.1   61.7 |
| Aged 175° F/3 days/H$_2$O | 67.2   60.3 | 66.9   61.5 |
| Peel Adhesion, Stock A, | | |
| ppi Room Temp. | 39.9 | 38.2 |
| | 38.0 | 38.5 |
| 250° F. | 24.8 | 21.7 |
| | 25.2 | 22.2 |
| Aged 300° F/24hrs | 23.3 | 22.7 |

EXAMPLE XIII a. Solution B was prepared by mixing the following components:

| | Parts |
|---|---|
| Resorcinol | 6.15 |
| Orzan S | 5.0 |
| 37% Formaldehyde in H$_2$O | 13.12 |
| 1N NaOH (4% NaOH) in H$_2$O | 2.0 |
| H$_2$O | 53.73 |
| | 80.00 (16.0 parts of solids) |

A quantity of Solution B containing 16.0 parts of solids was slowly added to 244 parts vinyl pyridine latex (1). Water was then added to produce a dip with about 20.0% total solids content. This dip is called Dip 2.

b. a pre-dip was prepared by mixing together:

| | Parts |
|---|---|
| phenol blocked methylene bis para phenylene diisocyanate | 3.6 |
| glycerol epichlorohydrin reaction product | 1.36 |
| gum tragacanth | 0.04 |
| water | 95.0 |

Polyester cord 1300/3 was dipped first in the pre-dip, dried, then dipped in Solution B. The cord was passed then into a hot air oven. The oven temperature was 430° F., and the time in the oven was about 45 seconds. After said drying and curing, the adhesive treated cord was laminated with standard type rubber compounded Stock C, and molded, and the resulting assembly was cured for 20 minutes at 305° F. After curing, the assembly was removed from the mold, cooled and tested according to the H-adhesion test described supra. The H-adhesion of the cord was 62.5 pounds per linear inch at room temperature and 39.5 at 250° F.

EXAMPLE XIV

An aramid core was dipped in solution B and dried in the same manner as the polyester cord. The H-adhesion at room temperature in stock C was 46.3. An aramid is a high molecular weight, aromatic polyamide. The cord is available from Du Pont.

The high molecular weight aromatic polyamides are obtained by condensation of metaphenylene diamines with isophthalic acid or paraphenylene diamines with terephthalic acids or m, p, or o-benzamides or mixtures of the above isomeric amines with isomeric acids. It is also possible to make polyamides using the above-mentioned isomers with substituents on the phenyl groups, halogen (—Cl), alkyl (CH$_3$—), etc., or to use diphenyl acids with diamines or aromatic diamines and/or diacids in which the aromatic nuclei are spaced by:

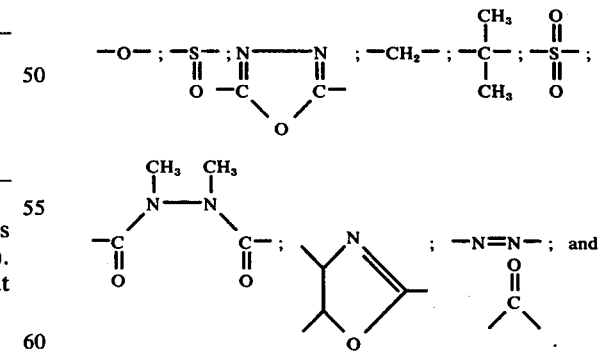

Instead of phenylene groups, the polymers can partly or totally contain heterocyclic rings.

EXAMPLE XV

Nylon cord was dipped in the lignin sulfonate dip of the present invention with satisfactory results, though the results were not as outstanding as those obtained with polyester, polyimide and glass. The dip is also applicable to rayon, cotton, steel and other cords.

The H-adhesion test is run using the following procedure:

In every case the glass cords to be treated are placed in parallel positions in a multiple-strand mold of the type described in the single-cord H-pull adhesion test designated ASTM D 2138-67, the mold is filled with unvulcanized rubber of the above-described compositions, the cords being maintained under a tension of 50 grams each, and the rubber is cured 20 minutes at around 305° F. to the elastic state. Each rubber test specimen is ¼ inch thick and has a ⅜ inch cord embedment.

After the rubber has been cured, the hot reticulate cured rubber piece is removed from the mold, cooled, and H-test specimens are cut from said piece, each specimen consisting of a single cord encased in rubber and having each end embedded in the center of a rubber tab or embedment having a length of around one inch or so. The specimens are then aged at least 16 hours at room temperature. The force required to separate the cord from the rubber is then determined at room temperature or 250° F. using an INSTRON tester provided with specimen grips. The maximum force in pounds required to separate the cord from the rubber is the H-adhesion value.

The Chemstrand Strip Adhesion test involves drum-winding dipped cord at the highest possible end count so as to eliminate all rubber strike through in the subsequent preparation of the sample. Samples of the same test stocks as were used in the H-adhesion test are calendered to 0.015 inch gauge and is sandwiched between two layers of the drum-wound cord. The construction is reinforced with calendered nylon square woven fabric to provide stiffness, and the resultant sample is vulcanized. The adhesion is measured as the force required to strip the test stock from the cord on a 1-inch wide sample, pulling parallel to the axial dimension of the cord at a peel angle of 180°.

D.P.U. refers to dip pickup in percent by dry weight and represents the weight of the coating divided by the bare glass or other cord weight.

What is claimed is:

1. A method for adhering a reinforcing element to a vulcanized conjugated diene rubber compound which comprises treating said element with a composition comprising an aqueous alkaline dispersion of from about 10 to 30% by weight (as dry solids) of a mixture of 100 parts of a rubbery vinyl pyridine terpolymer containing about 50 to 95% of a conjugated diolefin, about 5 to 40% of vinyl pyridine and about 0 to 40% of a styrene; about 1.0 to 30 parts of a lignin sulfonate, resorcinol and formaldehyde reaction product; and heat treating said element to remove the water and to heat set the solids from said composition and to deposit on said element from said composition a total of from about 2 to 30% by weight (solids), said heat treatment being conducted at temperatures of from about 300° to 500° F. for from about 30 to 150 seconds, cooling said treated element, combining said cooled treated element with an unvulcanized vulcanizable rubber consisting essentially of conjugated diene as the major elastomer component, and vulcanizing the same.

2. A method according to claim 1 where said lignin sulfonate is present at a level of from 2 to 10 parts.

3. A method according to claim 1 where said reinforcing element is a cord of glass.

4. A bonded composite material comprising a reinforcing element embedded in a vulcanized rubber, said element containing a total of from about 2 to 30% by weight (dry) based on the weight of said uncoated element of an adhesive composition comprised of a deposit of a heat set mixture containing 100 parts of a rubbery vinyl pyridine terpolymer, 1 to 30 parts of a lignin sulfonate, and resorcinol and formaldehyde reaction product, said adhesive composition forming a bond between said element and said rubber.

5. A bonded composite material according to claim 4 where said lignin sulfonate reaction product contains about 2 to 10 parts by weight of lignin sulfonate, 2 to 10 parts by weight of resorcinol and 2 to 10 parts by weight of formaldehyde.

6. A bonded composite material according to claim 4 where said rubbery vinyl pyridine terpolymer is a terpolymer containing from about 60 to 80% by weight of 1,3-butadiene, from 10 to 30% by weight of styrene, and from 5 to 30% by weight of 2-vinyl pyridine where the parts by weight ratio of said rubbery vinyl pyridine terpolymer to said lignin sulfonate reaction product is from about 100:5 to 100:30.

7. A bonded composite material according to claim 4 where said element is a cord of glass.

8. A bonded composite material according to claim 5 where said element is a cord of glass.

* * * * *